United States Patent [19]

Karas

[11] Patent Number: 4,736,795

[45] Date of Patent: Apr. 12, 1988

[54] COMPOSITION AND PROCESS FOR ENHANCED OIL RECOVERY

[75] Inventor: Lawrence J. Karas, West Chester, Pa.

[73] Assignee: Atlantic Richfield Company, Los Angeles, Calif.

[21] Appl. No.: 29,828

[22] Filed: Mar. 24, 1987

[51] Int. Cl.$^4$ ............................................. E21B 43/22
[52] U.S. Cl. ................................. 166/274; 252/8.554
[58] Field of Search ..................... 166/273, 274, 275; 252/8.554

[56] References Cited

U.S. PATENT DOCUMENTS

| | | | |
|---|---|---|---|
| 4,113,011 | 9/1978 | Bernard et al. | 166/273 |
| 4,203,491 | 5/1980 | Reisberg | 166/252 X |
| 4,436,672 | 3/1984 | Naylor | 166/274 X |
| 4,466,891 | 8/1984 | McCoy | 252/8.554 |
| 4,485,873 | 12/1984 | Balzer et al. | 166/273 X |
| 4,534,411 | 8/1985 | Morita et al. | 252/8.554 X |
| 4,572,294 | 2/1986 | Duerksen et al. | 166/273 |
| 4,676,316 | 6/1987 | Mitchell | 166/273 X |

*Primary Examiner*—George A. Suchfield
*Attorney, Agent, or Firm*—John C. Martin, Jr.

[57] ABSTRACT

A process for recovering crude oil from a subterranean formation comprising injecting into the formation a liquid composition consisting essentially of a specific surfactant in an aqueous medium and injecting a gas to urge the composition toward a production well. The surfactant has the general formula $RCH_2CH=C(R)CH_2O(CH_2CH_2O)_mX$, wherein R is $C_3$–$C_8$ alkyl, m is an integer from 1 to 10, and X is a sulfonate, sulfate, glyceryl sulfonate, or carboxylate anion neutralized by a sodium, potassium, or ammonium cation.

4 Claims, No Drawings

COMPOSITION AND PROCESS FOR ENHANCED OIL RECOVERY

BACKGROUND OF THE INVENTION

This invention relates to a process for the recovery of oil from subterranean oil bearing formations which may also contain highly saline and/or hard water, e.g. water containing appreciable quantities of sodium chloride and/or water soluble salts of divalent cations such as calcium or magnesium.

A large portion of the original oil in place in many oil-bearing subterranean formations remains in place after primary production and waterflooding. As oil reserves dwindle and exploration for new discoveries becomes more difficult and costly, the use of enhanced oil recovery techniques on previously discovered resources will play an increasingly important role in the overall production of crude oil.

Most of these techniques can be classified as solution flooding, mixture flooding, thermal oil recovery, tenside or polymer flooding or as a combination of several of these.

U.S. Pat. No. 3,335,792 discloses an oil recovery process wherein a foam bank is injected, followed by a non-gaseous dilute surfactant solution and then a further drive fluid.

U.S. Pat. No. 3,648,772 discloses a miscible-type recovery process using foam as a mobility buffer. The process uses a micellar dispersion followed by a foam and then a drive fluid.

U.S. Pat. No. 4,542,790 discloses a chemical flooding process using carboxymethylated ethoxylates as surfactants to control interfacial tension.

SUMMARY OF THE INVENTION

An improved process for recovering crude oil from a subterranean formation comprises injecting an aqueous surfactant solution into the subterranean formation along with a suitable displacing fluid and producing oil from production wells in the formation. The suitable displacing fluid may be a gas in its supercritical state. The mobility of the gas is controlled by the use of branched olefin ethoxy surfactant terminated with a sulfonate, sulfate, glyceryl sulfonate, or carboxylate anion and neutralized by a sodium, potassium, or ammonium cation.

DETAILED DESCRIPTION OF THE INVENTION

A process has been discovered for recovering crude oil from a subterranean formation having at least one injection means in fluid communication with at least one production means comprising:

(a) injecting into said formation a liquid composition consisting essentially of at least one surfactant selected from surfactants having a formula $RCH_2CH = C(R)CH_2O(CH_2CH_2O)_mX$, wherein R is $C_3-C_8$ alkyl, m is an integer from 1 to 10, and X is a sulfonate, sulfate, glyceryl sulfonate, or carboxylate anion neutralized by a sodium, potassium, or ammonium cation and an aqueous medium;

(b) injecting a gas to urge said composition toward said production means, provided that the said surfactant is present in an amount effective to reduce the mobility of said gas through said formation; and (c) recovering crude oil from said formation through said production means.

The gas useful in the enhanced oil recovery (EOR) is selected from the group consisting of methane, ethane, propane, natural gas, nitrogen, air, combustion flue gas, carbon dioxide, and mixtures thereof.

The suitable surfactant is selected from surfactants having a formula $RCH_2CH = C(R)CH_2O(CH_2CH_2O)_mX$, wherein R is $C_3-C_8$ alkyl, m is an integer from 1 to 10, and X is a sulfonate, sulfate, glyceryl sulfonate, or carboxylate anion neutralized by a sodium, potassium, or ammonium cation.

The preferred method of preparation of the surfactant is by preparation of an unsaturated aldehyde by Aldol condensation and dehydration, reduction to the unsaturated alcohol, condensation of 1-10 moles of alkylene oxide with the alcohol, and termination by reaction with the appropriate sulfonyl, sulfate, or carboxylate anion.

The aldehydes useful in the Aldol condensations for the preparation of the unsaturated aldehydes of this invention are the 5-10 carbon aldehydes such as pentanal, hexanal, heptanal, octanal, nonanal, and decanal.

The concentration of surfactant useful in the present process is in the range of about 0.10 to about 1.0 percent, on a weight basis, of surfactant per total liquid composition.

The surfactant may be injected into the formation as a separate stream and/or combined with the aqueous medium. To provide for ease of injection and for improved control of surfactant concentration in the formation, it is preferred that the surfactant be combined with the aqueous medium prior to injection.

The liquid composition is preferably injected into the formation in slugs, more preferably as slugs with a surfactant concentration in excess of its critical micelle concentration. The relative amounts of liquid composition and gaseous drive fluid injected into the formation may vary and, preferably, the liquid composition is injected into the formation in amounts similar to the minimum amount of micellar fluids typically injected in a micellar/polymer flooding type process wherein the surfactant is present in the liquid composition in a range of about 1% to 10% of the total on a weight basis. The size of the individual slugs of liquid composition injected in accordance with the present invention is dependent on the number of slugs injected and preferably range up to about 10%, more preferably up to about 5%, of the formation or reservoir pore volume. The total amount of liquid composition injected should be about 25% of the formation pore volume (including the pore volume occupied by recoverable hydrocarbons). The amount of gaseous drive fluid is such as to urge or push the liquid composition toward the production means, e.g., production well or wells. The amount of gaseous drive medium injected per injection is also dependent on the number of injection steps and may range up to about 100% or more of the formation or reservoir pore volume, based on the volume of the gaseous drive fluid at the conditions present in the formation. The rate of gas injection into the formation is preferably such that the liquid composition sweeps or moves through the formation at a substantially constant rate.

The following examples are meant to illustrate, but not limit the invention.

EXAMPLE I (a) Preparation of 2-hexyl-2,3-decenal:

In a single neck, 2 liter, round bottom flask, fitted with a 25 ml Dean-Stark trap, and a water cooled condenser, was placed 9.51 g (50 mmol) of p-toluenesulfonic acid and 156 ml (1.0 mol) of octanal dissolved in 750 ml of toluene. Under a blanket of argon heating was initiated. Water collection began immediately after reflux had begun. In a period of 30 min., 9 ml of water was collected. The reaction was allowed to continue for an additional 2 hours. The total amount of collected water was 10.5 ml. To the cooled reaction mixture, 250 ml of saturated sodium bicarbonate solution was added and product was isolated with a normal hexane workup.

The crude reaction product was filtered through a small column of FLORISIL using hexane as eluant. Solvents were removed under reduced pressure to afford 143 g (120% yield) of a dark oil. Gas chromatographic (GC) analysis indicates a 100% conversion. Purification via distillation afforded 63.4 g (53.2% yield) of the desired unsaturated aldehyde as a light yellow oil, bp=142° C. at 0.1 torr.

(b) Preparation of 2-hexyl-2,3-decenol:

In a 2 liter, 3 neck, round bottom flask, fitted with a serum cap and a 500 ml dropping funnel (assembled hot under a blanket of argon) was placed 51 g (215 mmol) of the unsaturated aldehyde dissolved in 200 ml of freshly distilled tetrahydrofuran (THF). The addition funnel was charged with 430 ml (215 mmol) of 0.5 M 9-borobicyclo[3.3.1]nonane (9-BBN), solution in THF. The contents of the flask were cooled to 0° C. by means of an ice-water bath and the contents of the dropping funnel were added in a dropwise manner over a period of 2.5 hours. The resultant clear solution was allowed to stir for an additional 2 hours. At the end of this time period, excess reagent was destroyed by the addition of 1 ml of methanol.

Solvents were removed under reduced pressure and product material was dissolved in 400 ml of hexane. The borane complex was destroyed by the addition of 14 ml (230 mmol) of 2-aminoethanol. The produced solids were removed via filtration and product material was isolated with a normal hexane workup. Removal of solvents under reduced pressure afforded a quantitative yield of the desired alcohol. Purification via distillation afforded the pure unsaturated alcohol, bp=132° C. at 0.02 torr.

(c) Preparation of 2-hexyl-2,3-decenoxyl hexaethylene glycol:

To a 2 l, 4 neck, round bottom flask, fitted with a gas inlet, padlle stirrer, and a 60 ml dropping funnel (assembled hot under a blanket of argon) was added 60.1 g (250 mmol) of the alkenol dissolved in 400 ml of hexanes, followed by 35.6 ml (255 mmol) of triethylamine. The resultant clear solution was cooled to −5° C. by means of ice-salt bath and the dropping funnel was charged with 20.1 ml (260 mmol) of freshly distilled methanesulfonyl chloride. The contents of the addition funnel were added dropwise over a 20 minute period. The resultant cloudy mixture was allowed to stir for an additional hour at −5° C. Product material was filtered through a sintered glass funnel to yield 80 g (100%) of alkene mesylate and the corresponding 34 g of triethylamine hydrochloride. The isolated mesylate derivative was used immediately for the following displacement reaction.

To a 2 l, 4 neck, round bottom flask, equipped with a mechanical paddle stirrer, serum cap, and a 250 ml addition funnel was charged 10.2 g (255 mmol) of potassium hydride followed by 500 ml of degassed toluene. The addition funnel was charged with 98.2 g (348 mmol) of hexaethylene glycol dissolved in 100 ml of toluene. The contents of the addition funnel were added to the hydride mixture in a dropwise manner at a rate to prevent solvent reflux. The addition funnel was replaced with a dry 500 ml addition funnel and was charged with the above alkene mesylate dissolved in 400 ml of toluene and added with efficient stirring over a 1 hour period. the resultant mixture was allowed to stir overnight at room temperature. The following morning, the addition funnel was replaced with a reflux condenser and product mixture was heated to reflux for 1 hour. The reaction mixture was cooled. Solvents were removed under reduced pressure to afford a yellow oil and solids. Solids were removed via filtration through a 2 inch pad of FLORISIL using chloroform as eluant. Removal of the solvents under reduced pressure afforded a quantitative yield of the desired alkene ethoxylate.

(d) Preparation of 2-hexyl-2,3-decenoxyl hexaethylene glycol sulfonate,(BOES):

In a 500 ml, 3 neck, round bottom flask, fitted with a magnetic stirrer and a serum cap (assembled hot under a blanket of argon) was added 34.0 g (65 mmol) of alkene ethoxylate, 10.5 ml (75 mmol) of triethylamine and 100 ml of pentane. The resultant clear solution was cooled by means of an ice-salt bath to −3° C. and 5.8 ml (75 mmol) of methanesulfonyl chloride was added dropwise via syringe. The resultant cloudy mixture was allowed to stir an additional hour. Product material was isolated via filtration over a sintered glass funnel. The solid filter cake was washed with an additional 300 ml of hexane. Removal of the solvents under reduced pressure afforded 38.6 g (100%) of the mesylate derivative.

The above mesylate was placed in a 1 l, round bottom flask, followed by the addition of 125 ml of water, 125 ml of isopropyl alcohol and 10.6 g (85 mmol) of sodium sulfite. This mixture was heated to reflux for 16 hours. Removal of solvents under reduced pressure followed by solids removal via filtration afforded 30.2 g (75%) of a oil.

Structure verification was obtained from FAB/MS. The only species seen by FAB/MS was a MW=590 sodium salt.

Purification via chromatography of 20.8 g of the above sulfonate over approximately 500 g of silica gel, using a 10/90 mixture of ethanol/chloroform as eluant was accomplished. Two main fractions were collected. The first fraction, (12.7 g), was mainly nonionic in character, possibly starting material. The second fraction, (8.0 g) was 100% anionic. IR analysis of this material has confirmed the structure as the desired BOES.

(e) Preparation of the glyceryl sulfonate derivative (BOEGS):

In a 250 ml, 3 neck, round bottom flask, fitted with a serum cap and a magnetic stirring bar was placed 52.0 g (100 mmol) of the alkene ethoxylate and 0.4 ml (3 mmol) of boron trifluoride etherate. The contents of the flask were heated to 80° C. and 8.0 ml (100 mmol) of freshly distilled epichlorohydrin was added in a dropwise manner via syringe. Care was taken so that the internal temperature was not allowed to exceed 85° C. After complete addition the temperature was maintained at 83° C. for an additional half hour with stirring. Product material was isolated with a normal ether workup.

In a 1 l, 3 neck, Morton flask, fitted with a magnetic stirrer, gas inlet and a water cooled condenser was placed the entire reaction mixture from the chlorohydrin preparation. A solution was made by the addition of 140 ml of 2-methoxy-2-ethoxyethanol, 245 ml of water and 25.2 g (200 mmol) of sodium sulfite. This solution was heated to reflux for 16 hours. Removal of the solvents under reduced pressure afforded 56 g of product. Solids were removed via filtration over Celite to yield 54.2 g of a clear, red-brown oil. LC analysis indicated a complete absence of starting material. This material was analyzed by FAB/MS for structure verification.

Purification via chromatography over 500 g of silica gel using a 10/90 mixture of ethanol/chloroform as eluant afforded two main fractions. The first fraction, 24.1 g was mainly nonionic. The second fraction, 18.5 g was the desired BOEGS.

EXAMPLE II

Into a berea core whose pore volume composition consisted of 79% Velma brine and 21 % decane was injected a 1:1 ratio (flow rate = 1 ft/day) of supercritical $CO_2$ and the same brine solution containing 5000 ppm of BOEGS, at 110° F., and 2000 psi.

The ability of the above additive, BOEGS (branched olefin ethoxy glyceryl sulfonate), to generate a $CO_2$ dispersion was evidenced by the generation of a stable pressure front ($\Delta = 30$ psi/ft) and an increase in the equilibrium gas storage to 60% $CO_2$. The oil saturation of the berea core was reduced to less than 5% of a pore volume after 1 PV of injected $CO_2$. This compared to a control run without surfactant which gave a pressure front of only 1 psi/ft ($\Delta P$) and an equilibrium gas storage of only 40% $CO_2$.

I claim:
1. A process for recovering crude oil from a subterranean formation having at least one injection means in fluid communication with at least one production means comprising:
    (a) injecting into said formation a liquid composition consisting essentially of at least one surfactant selected from surfactants having a formula $RCH_2CH=C(R)CH_2O(CH_2CH_2O)_mX$, wherein R is $C_3$–$C_8$ alkyl, m is an integer from 1 to 10, and X is a sulfonate, sulfate, glyceryl sulfonate, or carboxylate anion neutralized by a sodium, potassium, or ammonium cation and an aqueous medium;
    (b) injecting a gas to urge said composition toward said production means, provided that the said surfactant is present in an amount effective to reduce the mobility of said gas through said formation; and
    (c) recovering crude oil from said formation through said production means.
2. The process of claim 1 wherein said gas is selected from the group consisting of methane, ethane, propane, natural gas, nitrogen, air, combustion flue gas, carbon dioxide, and mixtures thereof.
3. The process of claim 1 wherein the surfactant is a branched olefin ethoxy glyceryl sulfonate.
4. The process of claim 1 wherein said surfactant is a glyceryl sulfonate derivative of 2-hexyl-2,3-decenoxyl hexaethylene glycol.

* * * * *